United States Patent [19]

Horn

[11] Patent Number: 4,502,339
[45] Date of Patent: Mar. 5, 1985

[54] THERMAL PULSE EMITTER OR DETECTOR ELEMENT

[75] Inventor: Klaus Horn, Brunswick, Fed. Rep. of Germany

[73] Assignee: Viscotherm Aktiengesellschaft, Hinteregg, Switzerland

[21] Appl. No.: 418,063

[22] Filed: Sep. 14, 1982

[30] Foreign Application Priority Data

Mar. 6, 1982 [DE] Fed. Rep. of Germany ....... 3208145

[51] Int. Cl.³ .......................... G01F 1/68; G01F 1/70
[52] U.S. Cl. .................................. 73/861.05; 73/204
[58] Field of Search ............................ 73/204, 861.05; 219/307, 374, 381, 382; 338/25, 58, 283, 284, 293, 299

[56] References Cited

U.S. PATENT DOCUMENTS

| 1,260,498 | 3/1918 | Wilson | 73/204 |
| 1,487,356 | 3/1924 | Packard | 73/204 |
| 2,724,271 | 6/1982 | Shawhan et al. | 73/204 |
| 4,228,683 | 10/1980 | Juffa et al. | 73/204 |
| 4,237,730 | 9/1980 | Feng | 73/204 |
| 4,299,124 | 11/1981 | Knapp et al. | 73/204 |
| 4,299,125 | 11/1981 | Romann et al. | 73/204 |
| 4,326,412 | 4/1982 | Kobayashi | 73/204 |
| 4,338,814 | 7/1982 | Romann | 73/204 |

Primary Examiner—Herbert Goldstein
Attorney, Agent, or Firm—Wells & Wells

[57] ABSTRACT

Disclosed is an emitting or detecting element for an in-line flow measuring instrument operating on the thermopulse-injection and transit time measuring principle. The element is composed of a severally meandering resistance path spread only across a partial cross-section which is small compared to the flow cross-section and which is anchored at its mutually insulated reversing points by means of holding tapes and electrode leads into the flow-wall of the measuring instrument. The emitting or detecting element can be produced in the most diverse ways. For instance, it can be etched out of thin metal foils by lithographic methods, it can be stamped out of sheets, and also it can be made by welding resistance wires together.

5 Claims, 3 Drawing Figures

Fig. 2
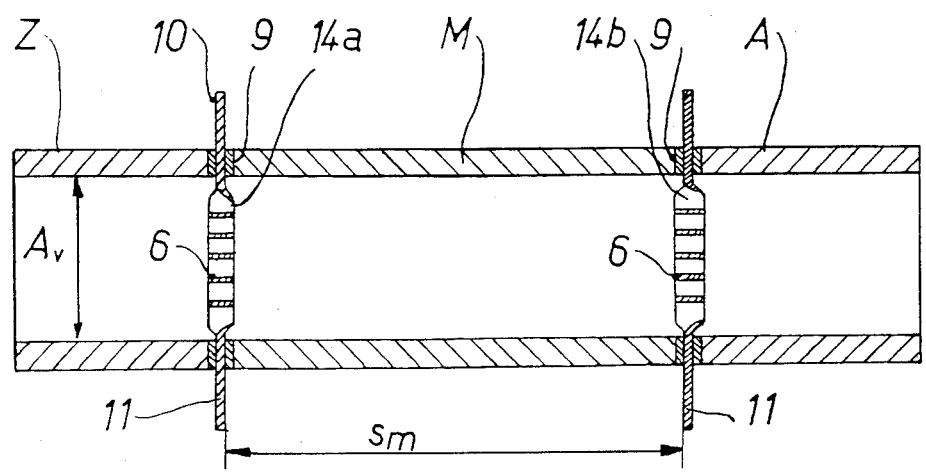
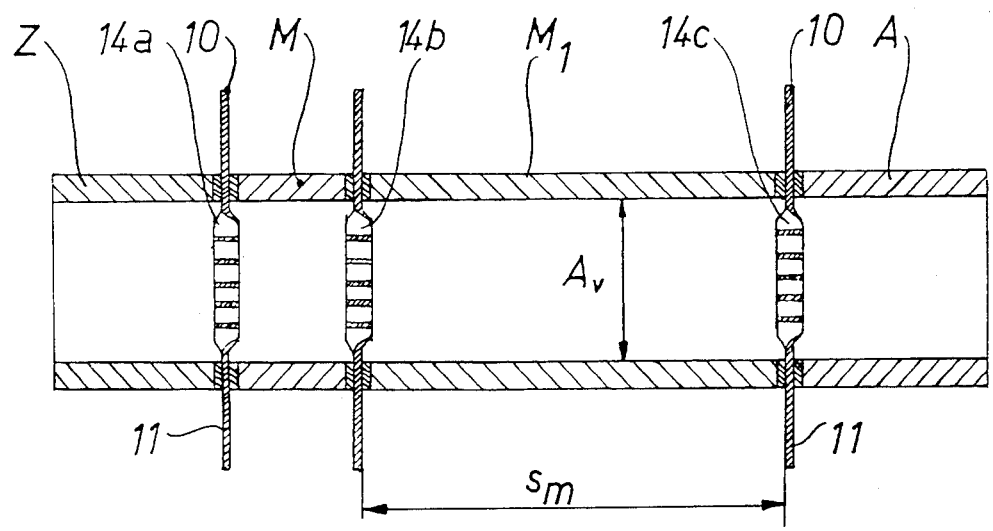
Fig. 3

THERMAL PULSE EMITTER OR DETECTOR ELEMENT

Applicant claims priority under 35 USC 119 for application P No. 32 08 145.6, filed Mar. 6, 1982, in the Patent Office of West Germany.

The invention concerns an emitting or detecting element for an in-line test instrument operating on the thermopulse-injection and transit time measuring method and also instrumentation built from these elements.

Many designs are already known for measuring the flow rates of media, employing the most diverse principles. Among the known methods are the thermopulse-injection procedures wherein the emitting element either deposits on the flowing medium the most minute interfering particles (dust, droplets, vapor, gas, reflector particles, etc.) or else injects very narrowly defined partial volumes in an impulsive manner with changes in their physical properties (temperature, viscosity, dielectric permeability constant, index of refraction, coloring, cloudiness, etc.) These injected corpuscles are entrained by the flow and are detected downstream when passing the sensing cross-section of one or several mutually offset detecting elements.

The flow velocity $q_v$ along a flow path is inversely proportional to the time $T_v$ required by an injected corpuscle to move across the flow-path segment $s_m$ between emitter and detector, or between two neighboring detectors. For a known flow cross-section A and a given flow-profile (correction factor k), the volume flow rate $Q_v$ will be known in the light of many analyses from the equation:

$$Q_v = k \cdot A \cdot q_v = k \cdot A \cdot (s_m/T_v) = K \cdot (1/T_v)$$

Compared with the other known in-line measuring methods, the thermopulse-injection procedures offer substantial advantages. Most of all they operate without movable parts and therefore are wear-free. Moverover, they emit linearly dependent output signals and can be used in conductive and non-conductive liquids and gases.

In particular, the thermopulse-injection procedure is distinguished by being variable in manifold ways and being adaptable to the most diverse media to be tested and measuring ranges.

In spite of the above cited advantages all the thermopulse-injection procedure variations so far have failed to gain wide acceptance in practice. This is explained mainly by two reasons, i.e.,:

(1) The procedures are of inadequate accuracy because of the failure to simultaneously make the injected corpuscles sufficiently small in volume and of the same physical-flow behavior as the measuring medium. This applies in particular to the procedure employing material injected corpuscles; and (2) Heretofore only principles but no practical embodiments have been provided for the emitter and/or detector elements. However, comprehensive research has shown that high-performance in-flow measuring instruments presume the injection procedure.

It is therefore the object of the invention to provide an easily manufactured and easily integrated emitter/detector element which operates reliably and is especially adaptable to the thermopulse-injection procedure.

The emitter or detector element of the invention offers the following advantages over those of the state of the art:

It can be manufactured economically in a semi- or fully-automatic manner so as to be reproducible using modern techniques.

Its action on the flow dynamics and geometry is exceedingly low.

It causes merely minute constrictions in the flow cross-section and thereby only minute losses in effective pressure.

It allows production of thermopulse-injection corpuscles of exceedingly small volumes and/or detection thereof.

Lastly, it permits producing and/or detecting these thermopulse-injection corpuscles only at specified partial cross-sections $A_N$ of the flow cross-section $A_v$, preferably near the maximum of the flow profile.

Moreover, the emitter or detector elements of the invention are exceedingly vibration-proof and can be assembled manually or using semi-automatic or fully-automatic assembly means into measuring instruments which are completely stable dimensionally and in time.

Furthermore they permit connection to simple electronic analyzing circuitry providing analog or digital test values and operate with so low an electric thermal power that even in the case of temperature-sensitive measured media (for instance foodstuffs, tobacco, mineral oil products and flavorings) there will be no danger and/or there will be no qualitative or chemical changes remaining after testing. The emitter or detecting element of the invention is suitable for operation within laminar flow and for extremely large ranges of in-line measurements. However, it is also possible to operate the elements in partially or fully turbulent flow by incurring system non-linearities which, however, can be corrected.

Photolithographic methods can be used to manufacture the emitter or detector elements, for instance as used in the manufacture of semiconductors, in particular in the manufacture of foil strain gauges. Employing these methods, the emitter or detector elements of the invention are etched out of suitable backing foils.

The invention will be further illustrated by reference to the accompanying drawings, in which:

FIG. 2 is a diagram of an in-line measuring instrument operating on the principle of the thermopulse-injection procedure and comprising an emitter and a detector element, and FIG. 3 is an instrument as shown in FIG. 2 but with one emitter element and two detecting elements.

FIG. 1 shows the heating zone 5 of an emitter element or the detection zone of a detecting element. This zone is composed of a meandering resistor network 6 with a low cover factor.

Figure 1:
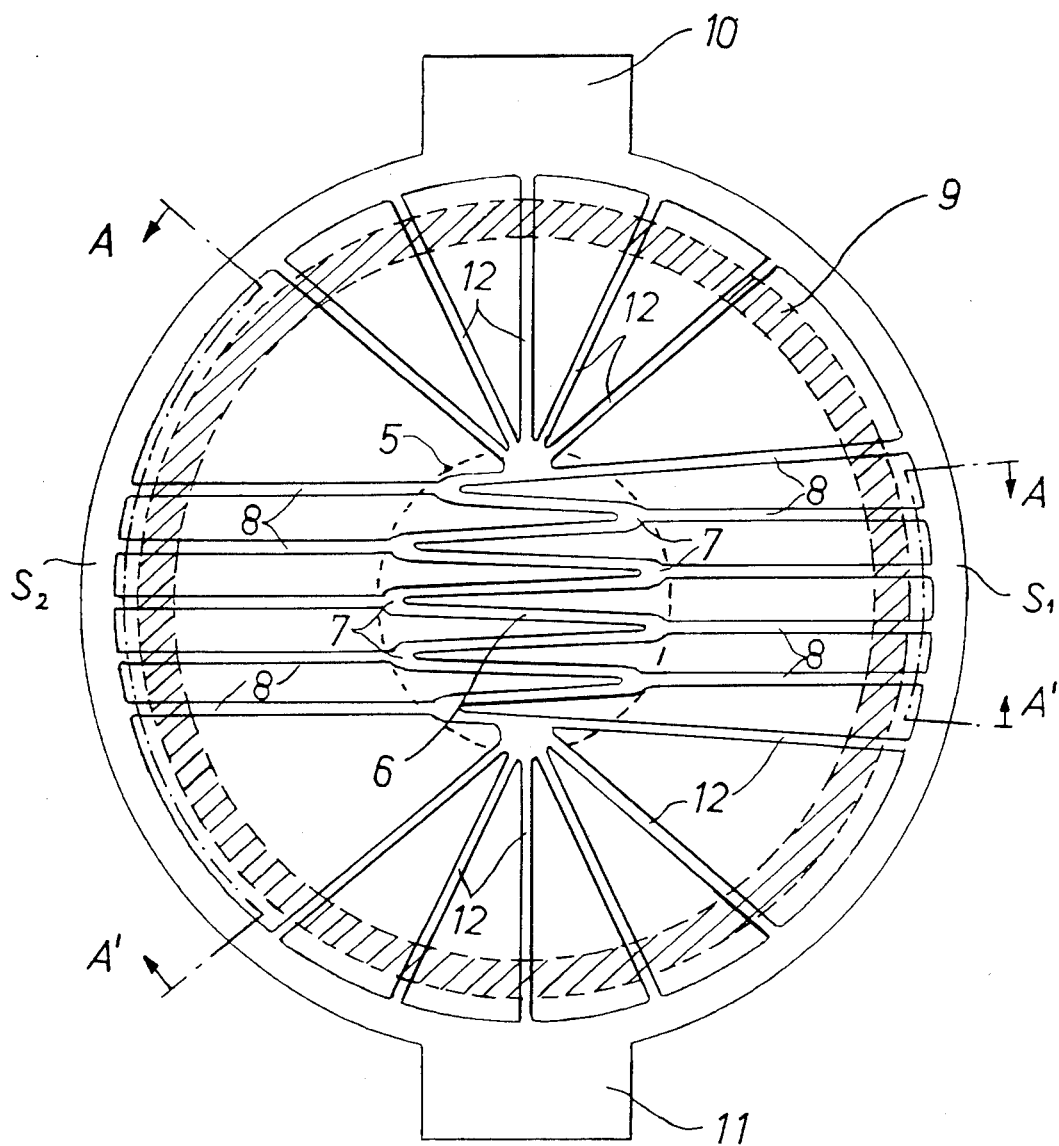
FIG. 1 is a schematic view in elevation of an emitter.

Thin and preferably radially outwardly extending holding tapes 8 issue from the turn-around sites 7 of this meandering pattern and are used to anchor the meandering turns in a closed peripheral rim $S_1$, $S_2$ and subsequently in the receiving wall 9 of the in-line measuring instrument.

The electrode leads 12 of the resistor network 6 preferably are arrayed diametrically at 10, 11 of the overall configuration in such a manner that only a very low lead resistance will be created for a low cover factor by connecting a plurality of leads 12 in parallel.

In another feature of the invention, the total geometry is arranged in such a way that a spatial distribution of the flow apertures will be obtained with minimal interference to the flow profile.

Furthermore it is possible to rotate the resistor network 6, the electrode leads 12, and the holding tapes 8, by 90° while being plastically deformed, about their spatially fixed suspension points and out of their plane of array, so that their flat side is parallel to the direction of flow and so that they present a minimum flow resistance to the flowing medium.

The foil materials must be selected depending on suitability regarding the particular application (medium being measured) and with regard to chemical and physical compatibilities.

Metal alloys and metals evincing high mechanical strength and temperature resistance with high resistivity are suitable for the emitter elements, for instance Cr-Ni, Pt, Constantan, etc. Applicable alloys and metals for the detector elements are those evincing a high temperature-coefficient of electrical resistivity, for instance Ni, Pt. Cu, etc., metals and alloys thereof.

In most cases, however, the same geometry and the same foil material will be adequate for both the emitter and the detector elements.

In a further feature of the invention, the metal foils—contrary to the case of the raw material of foil straingauges which are made to adhere by rolling so as to form a most intimate, lastingly stable, undetachable mechanical connection with the backing lamination—are joined using suitable adhesives, for instance, or low-melting solders so as to form a reversible bond permitting separation by chemical or physical means.

Alternatively, it is possible to use backing materials which temporarily dissolve in chemical solvents or which can be detached physically, for instance by ultrasonics.

The use of the emitter/detecting elements described in relation to FIG. 1 in an instrument for in-line measurements is disclosed in FIGS. 2 and 3. The emitter element is denoted by 14a and the detecting element by 14b in FIG. 2.

In the instrument shown in FIG. 2, one emitter element 14a and one detecting element 14b are bonded at the desired spacing to the resistor-geometry side onto the end face 9 of a central part M of a measuring casing made of an electrically non-conducting material, for instance ceramic, glass, plexiglass, etc.,—or made to adhere to it for instance in fused form—, where the central part evinces the flow cross-section $A_v$ desired for this application and the end-face spacing $s_m$.

After this intimate, undetachable junction has been implemented between the measuring casing central part M and the emitter and detector elements 14a, 14b with their resistor networks 6, the heretofore necessary backing laminations are detached using the appropriate suitable chemical or physical means, and are removed completely. In this state, the mentioned rotation by 90° of the resistor network and/or the holding tapes and/or the electrode leads into the direction of flow can be implemented with a comb-like tool.

Thereupon, a connecting stub A and Z—also made of an electrically non-conducting material—is bonded on or fused to the inlet and outlet sides respectively of the central part M of the measuring casing, and preferably these connecting stubs also evince the applicable cross-section $A_v$ to eliminate as much as possible disruptions in the homogeneous geometry of flow.

The procedure is the same for instruments comprising two and more detecting elements 14b, 14c, etc., as shown in FIG. 3 to meet higher accuracy requirements. In this case, a separate measurement casing central part $M_1, M_2 \ldots M_n$ is required between neighboring detector elements 14b, 14c on one hand and the emitting element 14a on the other, which are jointed into a common instrument in the manner described.

Finally, in some cases the feed electrodes 10, 11 of all the elements must be made operative by cutting out the support rim tapes $S_1, S_2$—which might be provided to improve the positioning—along the line A—A' in FIG. 1, as in the invention the holding tapes 8 of the resistor networks 6 in the blank elements initially may still be electrically connected to each other and with the electrode leads 12.

Where larger flow cross-sections $A_v$ and accordingly higher flow ranges are involved, it may be required for purposes of stabilization to make the resistor networks from thicker foils or even sheet metal. In such cases the concepts of the invention may be fully carried over to elements produced by precision-stamped sheets, or in special cases, by making them from welded resistance wires.

Examples of the best modes of carrying out the invention include preparing the emitting and detecting elements by:

(a) etching the emitting or detecting element together with the holding tape means (8) and the electrode lead means (12) out of thin metal foils by photo-lithographic methods;

(b) precision stamping the emitting or the detecting element out of sheet metal;

(c) manufacturing the emitting or detecting element by welding resistance wires;

(d) preparing the emitting or detecting element where the electrode lead means (12) to the resistance path (5) are composed of path segments of low ohmic value compared to the resistance path (5) and to that end preferably are composed of several electrode strips connected in parallel;

(e) etching the emitting or the detecting element out of a metal foil joined in very tight manner, for instance by bonding, soldering, etc., with a backing material, especially a backing foil, but where this junction later can be easily undone by chemical or physical methods, for instance by solvents or heat application respectively; and (f) preparing the initial structure of the emitting or the detecting element comprising a closed circumferential rim tape ($S_1, S_2$) into which issue all the holding tape means (8) and all the electrode lead means (12).

It will be obvious to those skilled in the art that many modifications may be made within the scope of the present invention without departing from the spirit thereof, and the invention includes all such modifications.

What I claim is:

1. An emitting or detecting element for an in-line measuring instrument having a measuring casing with an internal diameter defining a flow wall having a cross-section and an external diameter greater than said internal diameter, said measuring instrument operating on the thermopulse-injection and transit time measuring procedure, comprising:

(a) a resistance path comprising first and second ends and plurally meandering coil means, said resistance path having a cross-section less than said flow cross-section;
(b) reversing points on said coil means;
(c) holding tape means having a first end connecting said reversing points and a second end connecting said flow wall;
(d) electrode lead means extending from said flow wall and connecting said first and second ends of said resistance path; and
(e) a closed peripheral rim having an internal diameter greater than said external diameter of said measuring casing with said second ends of said holding tape means and said electrode lead means connected thereto.

2. The emitting and detecting element of claim 1 further comprising electrode tabs on said closed peripheral rim in proximity to said first and second ends of said resistance path.

3. The emitting and detecting element of claim 1, wherein each of said holding tape means and said electrode lead means has a narrow and a flat side and is comprised of plastically deformable material, said flat side rotated 90° in said measuring casing parallel to said flow wall to present a minimum flow resistance.

4. An emitting or detecting element for an in-line measuring instrument having a measuring casing with an internal diameter defining a flow wall having a cross-section and an external diameter greater than said internal diameter, said measuring instrument operating on the thermopulse-injection and transit time measuring procedure, comprising:
(a) a resistance path comprising first and second ends and plurally meandering coil means, said resistance path having a cross-section less than said flow cross-section;
(c) holding tape means having a first end connecting said reversing points and a second end connecting said flow wall;
(d) electrode lead means extending from said flow wall and connecting said first and second ends of said resistance path; and
(e) said electrode lead means comprising a plurality of electrode strips connected in parallel whereby said electrode lead means have a resistance less than said resistance path.

5. The emitting and detecting element of claim 4, wherein each of said holding tape means and said electrode lead means has a narrow and a flat side and is comprised of plastically deformable material, said flat side rotated 90° in said measuring casing parallel to said flow wall to present a minimum flow resistance.

* * * * *